Nov. 17, 1964  W. B. JARVINEN  3,157,836
SATURABLE REACTOR BIASING CIRCUIT
Filed Jan. 24, 1961
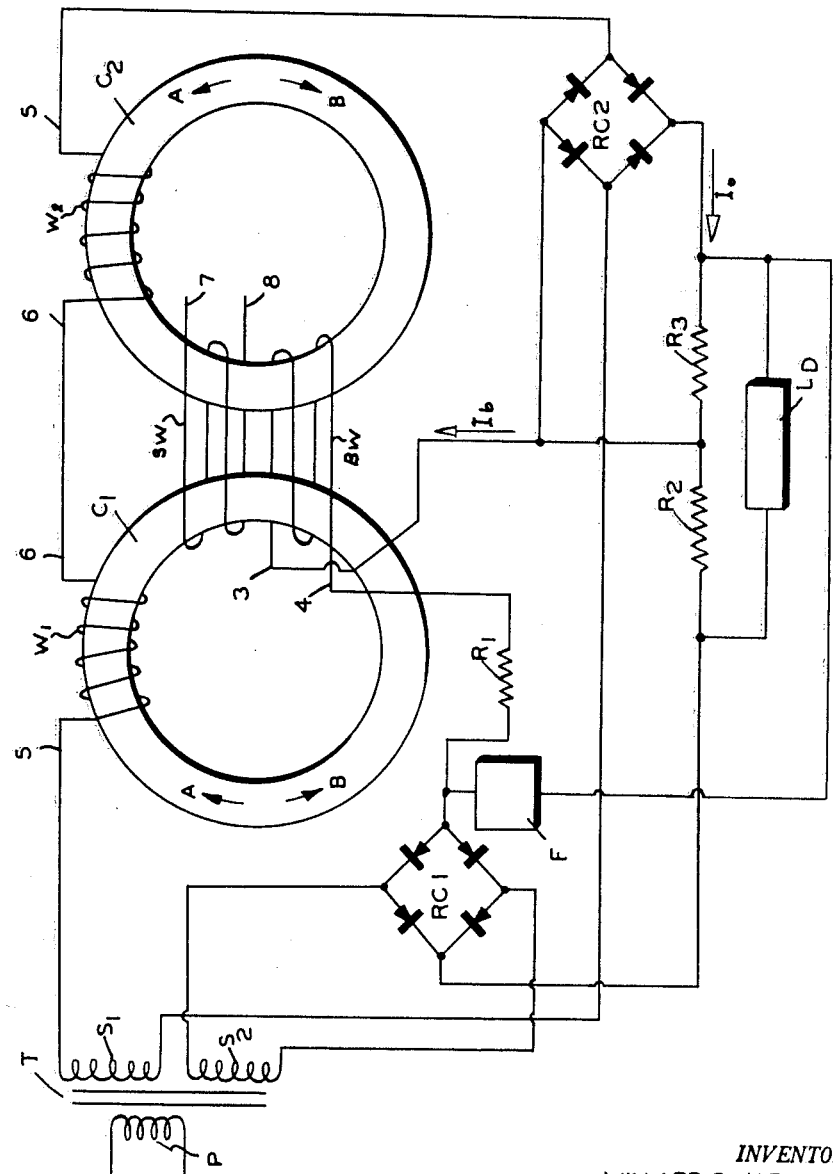
*INVENTOR.*
WILLARD B. JARVINEN
BY *John B. Sponsler*

United States Patent Office 3,157,836
Patented Nov. 17, 1964

3,157,836
SATURABLE REACTOR BIASING CIRCUIT
Willard B. Jarvinen, Roanoke, Va., assignor to General
Electric Company, a corporation of New York
Filed Jan. 24, 1961, Ser. No. 84,622
3 Claims. (Cl. 323—89)

This invention relates to magnetic amplifiers including series-connected saturable reactors, and, more particularly, is concerned with bias circuits in such devices wherein a change in the bias voltage will not cause a shift in the zero or null point of the device. The novel bias circuit not only permits a direct current output voltage having a polarity and magnitude that is proportional to the input signal, but also reduces the noise component normally present at the output of a saturable reactor.

An object of this invention, therefore, is to provide an improved magnetic amplifier having a fixed null point.

Another object of the invention is to provide a magnetic amplifier having a low noise level at its output.

The novel features of the invention are set forth with particularity in the appended claims. The invention itself, however, both as to its organization and method of operation, together with further objects and advantages thereof, may best be understood by referring to the following description and the accompanying drawing.

The drawing illustrates a dual core saturable reactor having the toroid cores C1 and C2 provided respectively with the series-opposing-connected load windings W1 and W2. The series windings W1 and W2 are connected to a source of alternating current (via the secondary S1 of a transformer T having a primary P connected to an A.C. power supply) and to a full wave rectifier RC2, the output of which is delivered to a resistor R3. A signal input winding SW, having input terminals 7 and 8 is provided common to both cores C1 and C2. A bias winding BW is also provided common to both cores C1 and C2, and a direct current bias is supplied to winding BW via a full wave rectifier RC1 through a pair of resistors R1 and R2, the latter resistor having a common connection with resistor R3. A load resistor LD is connected across resistors R2 and R3 to provide the output of the magnetic amplifier. The input to the full wave rectifier is furnished by the secondary S2 of the transformer T, thereby providing a bias voltage to the winding BW from the same A.C. power source as that to the load windings W1 and W2.

A filter F is provided in the bias supply described above to furnish a counter E.M.F. of equal frequency and magnitude to the A.C. noise signal, which for practical purposes may be considered to be twice the frequency of the A.C. power source and of substantially constant magnitude over a wide range of signal levels. The magnitude of the noise signal is expressed by the formula:

$$Vn = R3\left(I + \left(\frac{NSW}{NW}\right)^2 \frac{Vg}{Zc} + \left(\frac{NBW}{NW}\right)^2 \frac{Vg}{Zb}\right)$$

where,
$Vn$=Root-mean-square voltage of noise signal (at 2 times A.C. line frequency).
$I$=Exciting current when windings BW and SW are open circuited.
$NSW$=Turns of winding SW.
$NW$=Turns of winding W1 or W2.
$NBW$=Turns of winding Bw.
$Vg$=Root-mean-square voltage of S1.
$Zb$=Impedance of circuit feeding winding BW (at 2 times A.C. line frequency).
$Zc$=Impedance of circuit feeding winding SW (at 2 times A.C. line frequency).

A further provision of the arrangement described above is thta the maximum rated ampere turns of the gate winding W1, or W2, is equal to the maximum rated ampere turns of the control windings SW and BW, and a determination of the turns ratio of winding W1 (or W2) with respect to winding BW may be obtained from the ratio R3:R2.

The bias circuit may be analyzed with the assumption that the load LD has infinite impedance and that no signal current flows in the winding SW. Further assuming under these conditions that there is no leakage current in RC1, then $$Ib \times BW = Io \times W1$$

and, $$V1d = Io \times R3 - Ib \times R2$$

or, $$V1d = -Ib \times \left(R2 - \frac{BW}{W1} \times R3\right)$$

Hence, if $$R2 = \frac{BW}{W1} \times R3$$

the voltage V1d across the load LD will be zero. Consequently, the voltage V1d is unaffected by changes in Ib so that the voltage output of RC1 does not have to be regulated. Furthermore, if a current is applied to the winding SW of proper polarity to add ampere turns to the bias winding BW an output voltage V1d will appear across the load LD of a predetermined polarity, while if a current is applied of reverse polarity to the winding SW an output voltage V1d will appear across the load LD of the opposite polarity.

Although the above analysis is based upon no load and zero signal current input conditions, the bias circuit is equally effective for load conditions within the operating limits of the magnetic amplifier.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. A saturable reactor device having a pair of reactors, a winding on each reactor, a bias winding common to said reactors, a resistor connected to said reactor windings, another resistor connected to said bias winding, the turns ratio of the reactor winding and the bias winding being equal to the ratio of their respective resistors, an input winding common to said reactors, and an output derived across the said resistors in series.

2. A saturable reactor device having a pair of similar reactors, a winding on each reactor, a bias winding common to said reactors, a pair of series-connected resistors, one of said resistors connected to said bias winding and the other said resistor connected to said reactor windings, a source of alternating potential, a rectifier associated with said source for supplying potential to said bias winding through its respective resistor, means including a rectifier for supplying potential from said source to said other resistor under control of said reactor windings, an input winding common to said reactors, and an output resistor across said series-connected resistors.

3. A saturable reactor device having a pair of similar reactors, a winding on each reactor, a bias winding common to said reactors, a pair of series-connected resistors, one of said resistors connected to said bias winding and the other said resistor connected to said reactor windings, a source of alternating potential, a rectifier associated with said source for supplying potential to said bias windings through its respective resistor, a filter across said source arranged to provide a compensating frequency component to said bias winding, means including a rectifier for supplying potential from said source to said other resistor under control of said reactor windings, an input winding common to said reactors, and an output resistor across said series-connected resistors.

References Cited by the Examiner

UNITED STATES PATENTS

| | | | |
|---|---|---|---|
| 2,733,402 | 1/56 | Bixby | 321—25 X |
| 2,810,526 | 10/57 | Rogers | 323—89 X |
| 2,817,055 | 12/57 | Taubenslag | 321—25 X |
| 2,903,639 | 9/59 | Meszaros | 321—25 X |
| 3,015,073 | 12/61 | Mamon | 321—25 X |

LLOYD McCOLLUM, *Primary Examiner.*

MILTON O. HIRSHFIELD, *Examiner.*